United States Patent
van Lent

[11] 3,948,333
[45] Apr. 6, 1976

[54] MONOCYCLE

[76] Inventor: Constantin Paul van Lent, 108-02 72nd Ave., Forest Hills, N.Y. 11375

[22] Filed: Jan. 9, 1974

[21] Appl. No.: 431,670

[52] U.S. Cl. .................. 180/21; 180/116; 188/2 R
[51] Int. Cl.² ......................................... B62K 13/00
[58] Field of Search.......... 280/150 B, 150 AB, 205; 180/115, 21, 119, 118, 126, 1 R, 1 G, 7 J, 7 R, 84, 116; 188/2 R, 270; 123/127; 350/302; 291/47

[56] References Cited
UNITED STATES PATENTS

| | | | |
|---|---|---|---|
| 1,797,898 | 3/1931 | Cook | 291/47 X |
| 2,322,755 | 6/1943 | Voorhies | 280/150 B |
| 2,684,123 | 7/1954 | Mattis | 180/1 R |
| 2,749,143 | 6/1956 | Chika | 280/150 B |
| 2,757,575 | 8/1956 | Kovach | 350/302 X |
| 2,781,203 | 2/1957 | Kurilenko | 280/150 AB |
| 3,223,390 | 12/1965 | Bunze | 123/127 |
| 3,398,809 | 8/1968 | Wood et al. | 180/21 X |
| 3,648,806 | 3/1972 | Marks | 188/2 R |
| 3,764,159 | 10/1973 | Grime | 280/150 B |
| 3,783,849 | 1/1974 | Bramfitt | 123/127 |

*Primary Examiner*—M. H. Wood, Jr.
*Assistant Examiner*—John A. Pekar
*Attorney, Agent, or Firm*—Constantin Paul van Lent

[57] ABSTRACT

Traction may be enhanced by jets of air which may be mounted in front and at the rear of the wheels of the automobile. Furthermore an embodiment of the present invention provides a means to support a single-wheeled vehicle in an upright position by directing jets of air against the roadway. The air from the jets being exhausted from nozzles in front and in the rear of the single-wheeled vehicle, whereby tilting of the single-wheeled vehicle forwardly or rearwardly while it is in motion is prevented.

1 Claim, 4 Drawing Figures

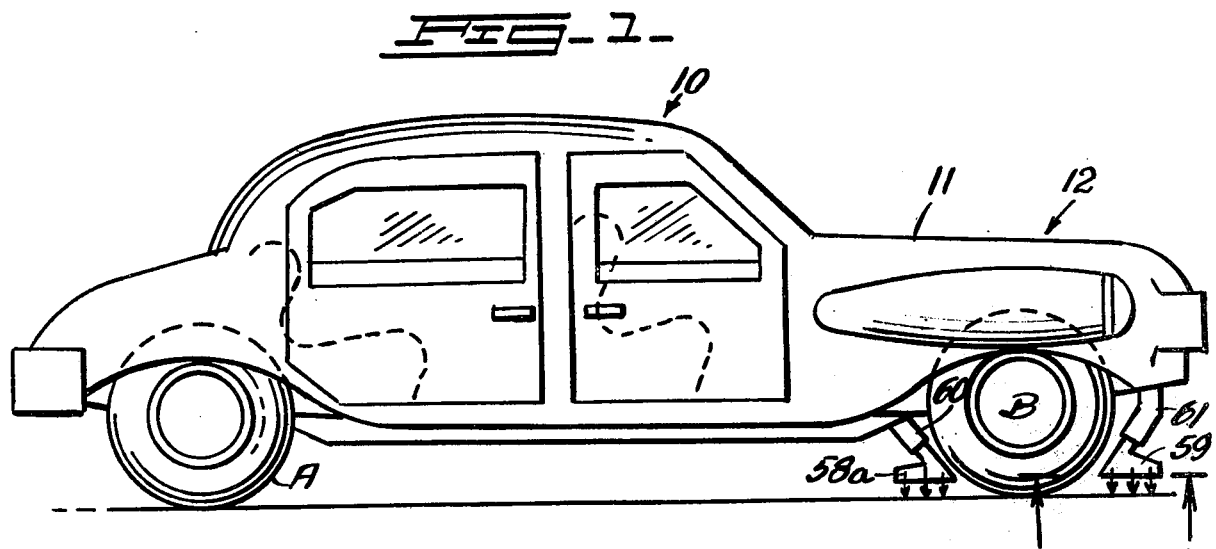
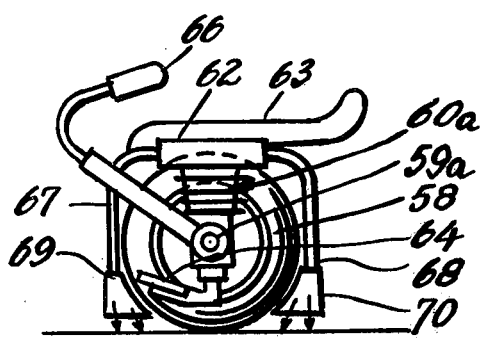
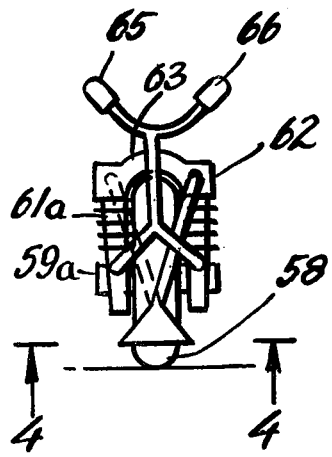

MONOCYCLE

An object of the present invention is to provide a means to utilize air jets to brake the speed of the car going forward. To this end adjacent to the car's wheels (tires) there will be jets which will blow air under pressure in an angle against the motion of the car thus slowing it down.

Another object of the present invention is to utilize the compressed air principle above described in a modification, to operate cycles, and particularly monocycles, that is vehicles which are using only one single wheel to remain upright while the driver seats upon a seat astride the single wheeled vehicle. Jets on either end of the wheel, in the front and in the rear will permit such a vehicle to remain upright despite the fact that it runs on one single wheel.

More and additional objects to make this type vehicle the safest vehicle yet on the road will be described at greater detail later. This invention also contains certain other features of construction and the combination and arrangement of several parts to be hereinafter fully described, illustrated in accompanying drawing, and in the specification and especially pointed out in the appended claims.

In describing the invention in detail, references will be had to the accompanying drawing where like character numerals denote like and corresponding parts throughout the several views in which:

FIG. 1 is a side elevational view of the all-safety-autocar showing the embodiment of the present invention;

FIG. 2 is a modification showing the application of blowing high pressure air to brake the speed of a fast moving vehicle or to support upright a vehicle running on a single wheel, or a monocycle;

FIG. 3 is a front-elevational view of FIG. 4 showing the monocycle vehicle supported and being driven on a single wheel; and FIG. 4 is a bottom view taken on the line 6—6 of FIG. 1, and FIG. 5, respectively showing the air channels through which the high pressure are is ejected to support the monocycle.

Referring now more particularly to the all-safety-autocar best shown in FIG. 1, it may be discerned that the automobile in question may be of conventional manufacture being provided with a conventional type body 11, consting of a front portion 12 and a rear portion 13, substantially as indicated. A pair of two tired wheels "A" and "B" of conventional design may be provided and mounted on a front axle and a rear axle (not shown).

In FIG. 1, it can be seen that the front wheel "B" of the car 10, on either side thereof is flanked by means of a pair of air-nozzles 58a and 59, respectively. These nozzles by means of the air connectors or air ducts 60 and 61 lead to an air compression system installed in the car (not shown). The air compressor system may be independently operated or may be directed against the roadway, at an angle, against the motion of the moving vehicle and in such a manner as to brake the forward speed and prevent accidents. The jets of air also may carry particles of sand or abrasive material which will cover the roadway and thus create additional traction for the car wheels to reduce the speed of the moving vehicle.

In FIGS. 2, 3 and 4 can be seen that a modification may be based on the principle of the high pressure air jets illustrated in FIG. 1 for the front wheel B. In other words the principle described in FIG. 1 for the front wheel "B" may be readily used to operate a vehicle which will run and balance on one single wheel; or a monocycle. In FIG. 2 the single wheel 68 is mounted to turn upon the shaft 59. The monocycle may be operated by means of a single combustion engine or for balance by means of a pair of engines, 60 and 61 mounted on either side of the wheel 58. The wheel 58 is driven in the usual manner by the crank shaft and the gear reduction of the internal combustion engines 60 and 61 (not shown). In addition the pistons in the engines 60 and 61 may be provided with means (not shown) to compress air into the tank 62 which is mounted over the single wheel 58. A driver's seat 63 is mounted over the air tank 62 on which the driver sits, with his feet resting on the pedals 64 which are secured to either side of the frame that carries the wheel 58. By means if the handle bars 65 and 66 the monocycle is directed forward. The line of direction may be easily changed to the left or the right by moving the driver's body center of gravity. If the driver leans his body to the left then the vehicle upon its single wheel will veer to the left and if the driver leans his body to the right then the vehicle will begin to move towards the right. Other and improved ways of changing the direction of the single wheeled vehicle may be devised. However experience has shown that by simply changing the center of gravity the driver can make the monocycle move to the right or to the left at will.

However, an important factor of the modification is the manner in which the single wheeled vehicle by means of its one wheel 58 and by the use of air jets can remain upright and not to tilt forward or in the rear when it is in motion and can remain always vertical. To this end there are provided air connecting means 67 and 68, respectively connecting air in the high pressure cylinder 62 to a pair of air shoes 69 and 70. These shoes are mounted one in the front and the other in the rear or behind the single wheel 58. The net effect of this action is to support the wheel erect and perfectly balanced while it is moving forward. The high pressure air jets which exhaust from the shoe up front and in the rear support and prevent the wheel from tilting. For hundreds of years inventors have endeavored to solve the problem of the single wheeled vehicle or monocycle and have failed. However, the high pressure jet air principle makes the monocycle principle possible.

A careful examination of the foregoing description in conjunction with the invention as illustrated in the drawing, will enable the reader to obtain a clear understanding and impression of the alleged features of merit and novelty, sufficient to clarify the construction of the invention as hereinafter claimed. Minor changes in shape, size and materials, and rearrangement of parts, may be resorted to in actual practice, as long as no departure is made from the invention claimed.

Having described my invention, what I claim is the following:

1. In a wheeled vehicle driven and supported upright on a single wheel, prime mover means for driving said wheel, a seating arrangement on said vehicle, means for controlling said vehicle while it is supported on said single wheel, means for compressing jets of air under high pressure, vertical nozzles positioned in front of and in the rear of said single wheel for directing said jets of air against a roadway, and air ducts for conducting said jets of air to said nozzles whereby tilting of the vehicle forwardly or rearwardly while it is in motion is prevented.

* * * * *